US 6,612,614 B2

(12) United States Patent
Wolfe

(10) Patent No.: US 6,612,614 B2
(45) Date of Patent: Sep. 2, 2003

(54) VEHICLE SEAT POSITION SENSING APPARATUS

(75) Inventor: George B. Wolfe, Plymouth, MI (US)

(73) Assignee: TRW Inc., Lyndhurst, OH (US)

( * ) Notice: Subject to any disclaimer, the term of this patent is extended or adjusted under 35 U.S.C. 154(b) by 16 days.

(21) Appl. No.: 09/863,858

(22) Filed: May 23, 2001

(65) Prior Publication Data

US 2002/0175506 A1 Nov. 28, 2002

(51) Int. Cl.[7] .............. B60R 21/32; B60N 2/02; G01L 1/22
(52) U.S. Cl. .............. 280/735; 73/862.634; 338/5
(58) Field of Search .......... 280/735; 180/273; 296/65.13; 297/217.2; 73/862.627, 862.634, 862.639; 701/45, 49; 338/5, 6, 2

(56) References Cited

U.S. PATENT DOCUMENTS

| 3,022,976 A | | 2/1962 | Zia | |
|---|---|---|---|---|
| 4,909,560 A | * | 3/1990 | Ginn | 296/65.15 |
| 5,074,583 A | * | 12/1991 | Fujita et al. | 280/735 |
| 5,232,243 A | * | 8/1993 | Blackburn et al. | 280/735 |
| 5,542,493 A | | 8/1996 | Jacobsen et al. | |
| 5,626,359 A | * | 5/1997 | Steffens, Jr. et al. | 280/735 |
| 5,803,491 A | | 9/1998 | Barnes et al. | |
| 5,967,549 A | * | 10/1999 | Allen et al. | 280/735 |
| 6,039,344 A | | 3/2000 | Mehney et al. | |
| 6,095,555 A | | 8/2000 | Becker et al. | |
| 6,113,139 A | | 9/2000 | Heximer et al. | |
| 6,170,865 B1 | | 1/2001 | Barron | |
| 6,170,866 B1 | | 1/2001 | Popp et al. | |
| 6,341,252 B1 | * | 1/2002 | Foo et al. | 280/735 |
| 6,351,994 B1 | * | 3/2002 | Pinkos et al. | 73/432.1 |
| 6,369,689 B1 | * | 4/2002 | Osmer et al. | 338/2 |

* cited by examiner

Primary Examiner—Peter C. English
(74) Attorney, Agent, or Firm—Tarolli, Sundheim, Covelll & Tummino L.L.P.

(57) ABSTRACT

An apparatus (10) is used in a vehicle having a seat frame (20) for supporting a vehicle occupant and a floor pan (4) for supporting the seat frame (20) for movement relative to the floor pan (4). The apparatus (10) includes a deflection member (50), a sensor lever (70), and a sensor (79). The deflection member (50) connects to the seat frame (20) for movement with the seat frame (20). The deflection member (50) has a first deflection surface (51). The sensor lever (70) connects to the floor pan (4). The sensor lever (70) has a second deflection surface (75) for engaging the first deflection surface (51) of the deflection member (50) and for deflecting as the seat frame (20) moves relative to the floor pan (4). The amount of deflection of the sensor lever (70) changes as the seat frame (20) moves relative to the floor pan (4). The sensor (79) senses the deflection of the sensor lever (70) and provides an output signal indicative of the amount of deflection of the sensor lever (70).

18 Claims, 2 Drawing Sheets

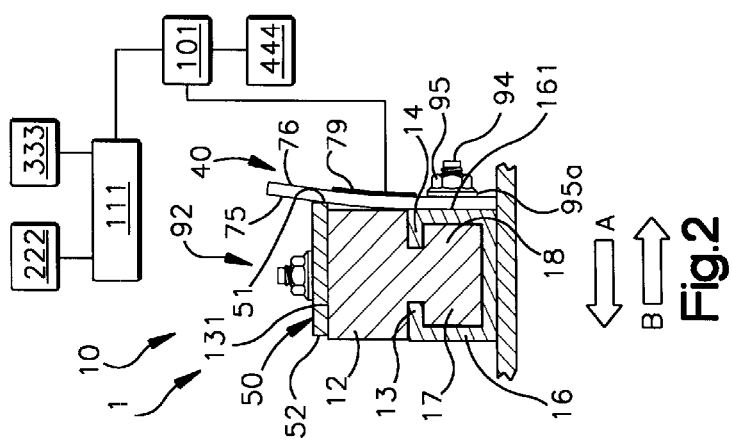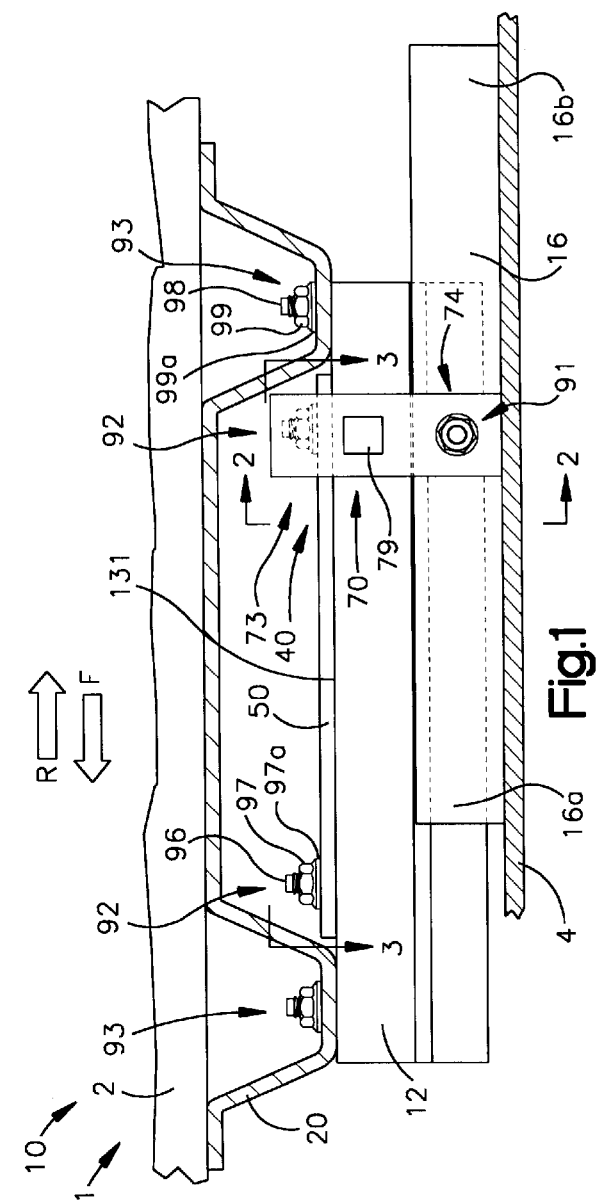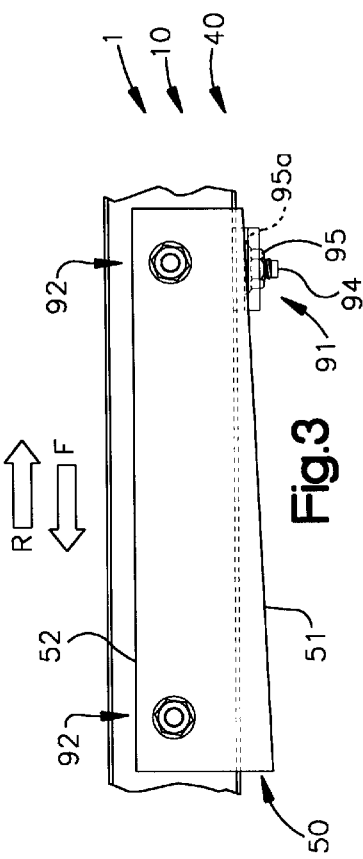

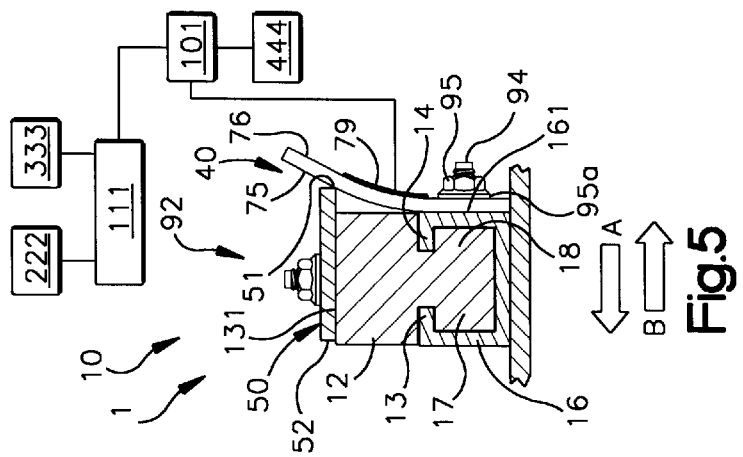
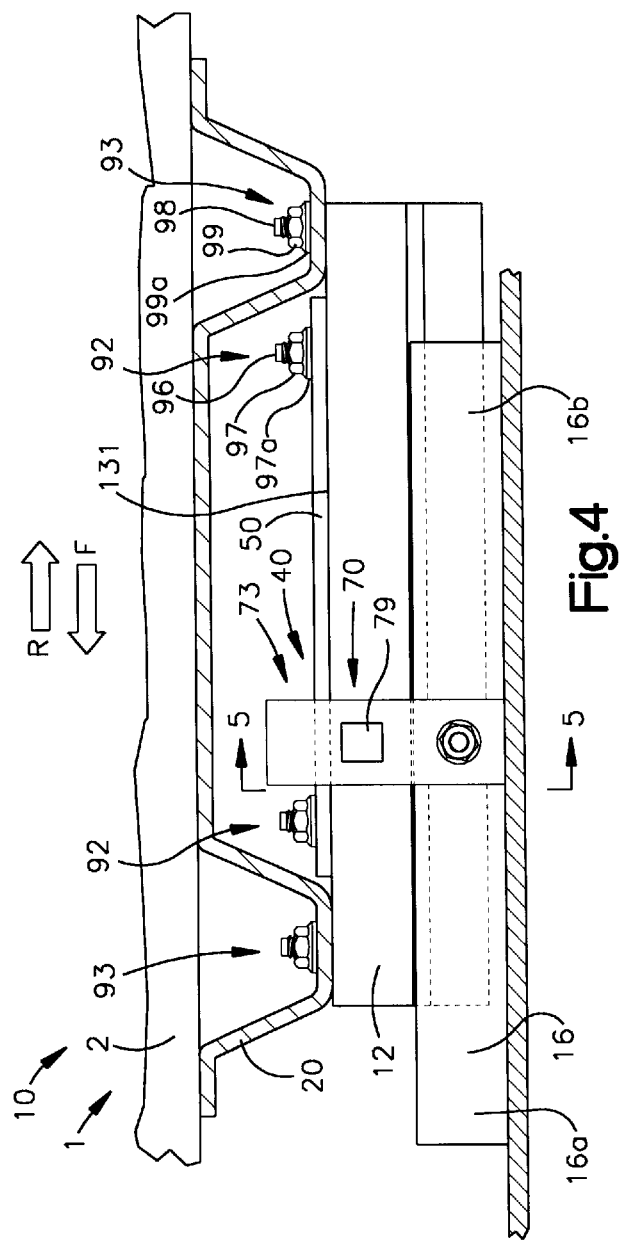

VEHICLE SEAT POSITION SENSING APPARATUS

TECHNICAL FIELD

The present invention relates to an apparatus for sensing a position of a device, and more particularly, to an apparatus for sensing a position of a vehicle seat.

BACKGROUND OF THE INVENTION

A conventional vehicle occupant position sensing apparatus includes a position switch placed adjacent a vehicle seat frame and a support mount for the seat. The position switch provides a signal when the vehicle seat frame reaches a predetermined position relative to the support mount.

SUMMARY OF THE INVENTION

One feature of the present invention relates to an apparatus for use in a vehicle having a seat frame for supporting a vehicle occupant and a floor pan for supporting the seat frame for movement relative to the floor pan. The apparatus includes a deflection member, a sensor lever, and a sensor. The deflection member connects to the seat frame for movement with the seat frame. The deflection member has a first deflection surface. The sensor lever connects to the floor pan. The sensor lever has a second deflection surface for engaging the first deflection surface of the deflection member and for deflecting as the seat frame moves relative to the floor pan. The amount of deflection of the sensor lever changes as the seat frame moves relative to the floor pan. The sensor senses the deflection of the sensor lever and provides an output signal indicative of the amount of deflection of the sensor lever.

Another feature of the present invention relates to an apparatus for use in a vehicle having a seat for a vehicle occupant and a floor pan for supporting the seat. The apparatus comprises an actuatable vehicle occupant protection device and a vehicle seat frame for supporting a vehicle occupant on the seat. The vehicle seat frame is movable linearly in a forward direction of vehicle travel and in a rearward direction of vehicle travel relative to the floor pan through an adjustment path. A mechanism senses each position of the seat relative to the floor pan in the adjustment path and provides a first unique output signal indicative of each position. A sensor senses the weight of the vehicle occupant in the seat and provides a second output signal indicative of the weight of the vehicle occupant. A controller receives the first unique output signal and the second output signal. The controller controls actuation of the vehicle occupant protection device in accordance with the first and second output signals.

BRIEF DESCRIPTION OF THE DRAWINGS

The foregoing and other features of the invention will become more apparent to one skilled in the art upon consideration of the following description of the invention and the accompanying drawings, in which:

FIG. 1 is a schematic view of an apparatus embodying the present invention;

FIG. 2 is a schematic sectional view of the apparatus of FIG. 1 taken along line 2—2 of FIG. 1;

FIG. 3 is a schematic sectional view of the apparatus of FIG. 1 taken along line 3—3 of FIG. 1;

FIG. 4 is a schematic view of the apparatus of FIG. 1 shown under a different condition; and FIG. 5 is a schematic sectional view of the apparatus of FIG. 4 taken along line 5—5 of FIG. 4.

DESCRIPTION OF THE PREFERRED EMBODIMENTS

According to the present invention, as viewed in FIGS. 1–5, a position sensing apparatus 10 is used in a vehicle 1 having a vehicle seat 2 for a vehicle occupant. A vehicle floor pan 4 supports the vehicle seat 2. The apparatus 10 includes a vehicle seat frame 20 for supporting the vehicle seat 2, an upper track 12 for supporting the vehicle seat frame, a lower track 16 for adjustably supporting the upper track, a position sensing mechanism 40, a first fastener assembly 91, a second fastener assembly 92, and a third fastener assembly 93.

The vehicle seat frame 20 mainly supports a weight load of the vehicle occupant in the vehicle seat 2. The vehicle seat frame 20 may also support lateral loads imparted to it by the vehicle occupant or other devices, such as seat belts. The load of the vehicle occupant in the vehicle seat 2 is transmitted from the vehicle seat frame 20 through the upper track 12 and the lower track 16 to the vehicle floor pan 4. During a vehicle collision, the seat frame 20 may also sustain upward and other lateral loads.

The lower track 16, or mounting member, is fixedly attached to the vehicle floor pan 4 in a known manner, such as by welding. The lower track 16 has two opposite side rails 13, 14 (FIG. 2). The upper track 12 has two opposite rails 17, 18 that slidingly engage the respective side rails 13, 14 of the lower track 16. The upper track 12 may slide linearly on the lower track 16 for manual forward or rearward adjustment of the position of the vehicle seat 2 relative to the vehicle 1 for occupants of different sizes, as is known in the art. This linear, sliding adjustment defines a linear adjustment path of the vehicle seat 2 relative to the vehicle 1.

The position sensing mechanism 40 senses the forward/rearward linear position of the vehicle seat 2 in the vehicle 1. The mechanism 40 provides a position signal indicative of each and every linear position of the vehicle seat 2 in the adjustment path of the vehicle seat. The position sensing mechanism 40 includes a deflection member 50, a sensor lever 70, and a sensor 79.

The deflection member 50 is secured to the vehicle seat frame 20 via the upper track 12. The deflection member 50 has a first, angled deflection surface 51 and a second, longitudinal surface 52 opposite the first deflection surface (FIG. 3).

The sensor lever 70 is secured to the vehicle floor pan via the lower track 16. The sensor lever 70 includes a first end portion 73 and a second end portion 74 opposite the first end portion. The first end portion 73 has a third deflection surface 75 and a fourth sensing surface 76 opposite the third deflection surface. The third deflection surface 75 of the first end portion 73 engages the first deflection surface 51 of the deflection member 50.

The amount of deflection of the sensor lever 70 changes as the vehicle seat frame 20 moves linearly in a forward direction F relative to the vehicle floor pan 4. The amount of deflection of the sensor lever 70 also changes as the vehicle seat frame 20 moves linearly in a rearward direction R relative to the vehicle floor pan 4.

As the seat frame 20 is adjusted forward or rearward in the vehicle 1, the first deflection surface 51 of the deflection member 50 engages the third deflection surface 75 of the sensor lever 70, either reducing the amount of deflection (forward movement) of the sensor lever or increasing the amount of deflection (rearward movement) of the sensor lever. As viewed in FIGS. 2 and 5, the first deflection surface 51 moves in a first direction A transverse to the forward direction F of the vehicle 1 as the vehicle seat 2 moves in the forward direction (from FIG. 4 to FIG. 1) relative to the vehicle. The first deflection surface 51 moves in a second direction B transverse to the forward direction F of the vehicle 1 as the vehicle seat 2 moves in the rearward direction (from FIG. 1 to FIG. 4) relative to the vehicle. The first direction A is opposite the second direction B.

As viewed in FIG. 3, the first deflection surface 51 thus defines a predetermined angle in the horizontal plane between the first deflection surface 51 and the forward direction F of the vehicle 1. As the third deflection surface 75 engages the first deflection surface 51, the elasticity of the sensor lever 70 moves the third deflection surface 75 in the first direction A transverse to the forward direction F as the vehicle seat 2 moves in the forward direction relative to the vehicle. The third deflection surface 75 is deflected in the second direction B transverse to the forward direction F by the first deflection surface 51 as the vehicle seat 2 moves in the rearward direction R relative to the vehicle.

The first deflection surface 51 typically moves transversely about 1 mm from the most forward to the most rearward positions of the vehicle seat 2. Thus the predetermined angle is usually about 0.05° (shown exaggerated in FIG. 3).

The sensor lever 70 is typically constructed of a suitable spring-like material such as steel or an engineered laminate. Aluminum may also be used entirely or in combination with steel or other suitable metal.

The sensor 79 is mounted on the fourth sensing surface 76 of the sensor lever 70. The sensor 79 senses the deflection of the sensor lever 70 and provides an output signal indicative of the amount of deflection of the sensor 70.

The sensor 79 senses the deflection, or bending, of the sensor lever 70 and provides an electrical output signal indicative of, or dependent upon, the amount of bending of the sensor lever. The sensor 79 is preferably a strain gauge sensor that is applied to the fourth sensing surface 76 of the sensor lever 70, preferably by a silk-screening process.

The first end portion 73 of the sensor lever 70 may be over-molded with a polymer (not shown) for environmentally sealing the sensor 79 mounted thereon. The first end portion 73 of the sensor lever 70 may then have a greater horizontal thickness than the unsealed second end portion 74 of the sensor lever 70. The polymer may also reduce friction between the first and third deflection surfaces 51, 75 as the vehicle seat 2 is adjusted forward/rearward in the vehicle 1.

The first fastener assembly 91 secures the sensor lever 70 to the lower track 16. The first fastener assembly 91 includes a first fastener 94 and a first fastener member 95. The first fastener 94 may be a stud extending from a side surface 161 of the lower track 16. As viewed in FIG. 2, the shaft of the first fastener 94 extends horizontally from the side surface 161 through an opening (not shown) in the second end portion 74 of the sensor lever 70.

The first fastener member 95 may be a nut that is threaded onto the first fastener 94. The first fastener 94 and first fastener member 95 thereby fixedly secure the sensor lever 70 to the vehicle floor pan 4 as the first fastener member 95 is tightened sufficiently against the sensor lever 70. A washer 95a may also be interposed between the sensor lever 70 and the first fastener member 95. Another fastener assembly (not shown) may be provided in order to prevent any undesired rotation of the sensor lever 70 relative to the lower track 16.

The second fastener assembly 92 secures the deflection member 50 to the upper track 12. The second fastener assembly 92 includes two fasteners 96 and two fastener members 97. The fasteners 96 may be studs extending from an upper surface 131 of the upper track 12. As viewed in FIGS. 1 and 2, the shaft of the fasteners 96 extend upward from the upper surface 131 through corresponding openings (not shown) in the deflection member 50.

The fastener members 97 may be nuts that are threaded onto the fasteners 96. The fasteners 96 and fastener members 97 thereby fixedly secure the deflection member 50 to the upper track 12 as the fastener members 97 are tightened sufficiently against the deflection member 50. Washers 97a may also be interposed between the deflection member 50 and the fastener members 97.

The third fastener assembly 93 secures the vehicle seat frame 20 to the upper track 12. The third fastener assembly 93 includes two fasteners 98 and two fastener members 99. The fasteners 98 may be studs extending from the upper surface 131 of the upper track 12. As viewed in FIG. 1, the shaft of the fasteners 98 extend upward from the upper surface 131 through corresponding openings (not shown) in the vehicle seat frame 20.

The fastener members 99 may be nuts that are threaded onto the fasteners 98. The fasteners 98 and fastener members 99 thereby fixedly secure the vehicle seat frame 20 to the upper track 12 as the fastener members 99 are tightened sufficiently against an upper surface of the vehicle seat frame 20. Washers 99a may also be interposed between the upper surface of the vehicle seat frame 20 and the fastener members 99.

The fasteners 94, 96, 98, the fastener members 95, 97, 99, and washers 95a, 97a, 99a of each fastener assembly 91, 92, 93 may be constructed of a suitable metal such as stainless steel. Other corrosion-resistant materials of sufficient strength may also be used.

As viewed in FIGS. 1 and 4, the sensor lever 70 is typically mounted midway between the forward and rearward ends 16a, 16b of the lower track 16. The sensor lever 70 is mounted in an initially deflected condition so that the sensor 79 will produce an output signal at the most forward position (FIGS. 1 and 2) of the vehicle seat 2.

The sensor 79 produces an output signal directly proportional to the displacement of the sensor lever 70. This displacement is imparted to the sensor lever 70 by the deflection member 50. The sensor 79 may be electrically connected to a controller 101 by lead wires so that the controller may receive the output signal from the sensor 79 and determine an appropriate response for the particular position of the vehicle seat 2.

The position sensing mechanism 40 may be used in conjunction with a device 111 for sensing the weight of an occupant of the vehicle seat 2. Such a device typically has a weight sensing mechanism with sensors 222, 333 underneath the four corners of the vehicle seat frame 20. The sensors are typically secured relative to the vehicle floor pan 4 and do not move relative to the vehicle floor pan when the vehicle seat 2 is adjusted forward or rearward in the vehicle 1. The controller 101 receives output signals from the weight sensors 222, 333 for determining the weight of the vehicle occupant.

As a result, when the vehicle seat 2 is moved toward its most forward position, all of the weight of the occupant may be sensed by front sensors 222 under the front corners of the vehicle seat frame 20. Rear sensors 333 under the rear corners of the vehicle seat frame 20 may even sense an upward load due to the vehicle seat 2 acting as a lever pivoting about the front sensors 222, which act as a fulcrum for the lever.

When the vehicle seat 2 is moved toward its most rearward position, all of the weight of the occupant may be sensed by the rear sensors 333. The front sensors 222 may even sense an upward load due to the vehicle seat 2 acting as a lever pivoting about the rear sensors 333, which act as a fulcrum for the lever.

The controller 101 may use the output signal from the position sensing mechanism 40 to account for this type of effect. The controller 101 may define certain position signals that are known to produce upward (or erratic) loads at particular weight sensors. The controller 101 may disregard the output from those particular weight sensors when the vehicle seat 2 is moved to those certain positions, as determined by the output signals from the position sensing mechanism 40.

The controller 101 may also use the output signal from the position sensing mechanism 40 to control other devices in the vehicle 1. For example, if a driver's side seat of a vehicle is disposed in its forward most position in the vehicle 1, as determined by the position sensing mechanism 40, the controller 101 may also cause an actuatable, inflatable vehicle occupant protection device, such as a driver's side air bag 444 mounted in a steering wheel of the vehicle 1, to under-inflate to less than the full capacity of the inflatable device. This less than complete inflation may lessen the impact that the inflatable device 444 imparts to the occupant of the driver's side seat.

The controller 101 may use more complex algorithms in order to determine the functioning of other devices (not shown) at specific positions of the vehicle seat 2. The algorithms may be developed empirically or theoretically.

From the above description of the invention, those skilled in the art will perceive improvements, changes and modifications. Such improvements, changes and modifications are intended to be included within the scope of the appended claims.

Having described the invention, the following is claimed:

1. An apparatus for use in a vehicle having a seat frame for supporting a vehicle occupant and a floor pan for supporting the seat frame for movement relative to the floor pan, said apparatus comprising:
   a deflection member for connection with the seat frame for movement with the seat frame, said deflection member having a first deflection surface;
   a sensor lever for connection with the floor pan, said sensor lever having a second deflection surface for engaging said first deflection surface of said deflection member and for deflecting as the seat frame moves relative to the floor pan, the amount of deflection of said sensor lever changing as the seat frame moves relative to the floor pan; and
   a sensor for sensing the deflection of said sensor lever and providing an output signal indicative of the amount of deflection of said sensor lever.

2. The apparatus as set forth in claim 1 wherein said sensor lever moves in a first direction relative to the seat frame, said first direction being transverse to a direction of travel of the vehicle.

3. The apparatus as set forth in claim 2 wherein said sensor lever moves in a second direction relative to the seat frame, said second direction being transverse to the direction of travel of the vehicle.

4. The apparatus as set forth in claim 3 wherein said first direction is opposite said second direction.

5. The apparatus as set forth in claim 1 wherein said deflection member moves horizontally as the seat frame moves relative to the floor pan.

6. The apparatus as set forth in claim 1 further including a fastener assembly for connecting said deflection member to the seat frame.

7. The apparatus as set forth in claim 1 further including a fastener assembly for connecting said sensor lever to the floor pan.

8. The apparatus as set forth in claim 1 wherein said first deflection surface and the direction of movement of the seat frame define an angle greater than zero.

9. The apparatus as set forth in claim 1 wherein the amount of deflection of said sensor lever increases as the seat frame moves relative to the floor pan.

10. The apparatus as set forth in claim 1 wherein the amount of deflection of said sensor lever decreases as the seat frame moves relative to the floor pan.

11. An apparatus for use in a vehicle having a seat for a vehicle occupant and a floor pan for supporting the seat, said apparatus comprising:
    a mounting member for securing the seat to the floor pan;
    a vehicle seat frame for supporting the vehicle occupant on the seat, said vehicle seat frame being movable in a forward direction of vehicle travel and in a rearward direction of vehicle travel relative to the floor pan; and
    a mechanism for sensing the position of the seat relative to the floor pan, said mechanism including:
      a deflection member secured to said vehicle seat frame and movable with said vehicle seat frame, said deflection member having a first deflection surface;
      a sensor lever secured to said mounting member, said sensor lever having a second deflection surface engaging said first deflection surface of said deflection member, said sensor lever deflecting as said vehicle seat frame moves relative to the floor pan, the amount of deflection of said sensor lever changing as said vehicle seat frame moves relative to the floor pan; and
      a sensor for sensing the deflection of said sensor lever and providing an output signal indicative of the amount of deflection of said sensor lever.

12. The apparatus as set forth in claim 11 further including a controller utilizing said output signal for controlling another device of the vehicle.

13. An apparatus for use in a vehicle having a seat for a vehicle occupant and a floor pan for supporting the seat, said apparatus comprising:
    an actuatable vehicle occupant protection device;
    a vehicle seat frame for supporting a vehicle occupant on the seat, said vehicle seat frame being movable linearly in a forward direction of vehicle travel and in a rearward direction of vehicle travel relative to the floor pan through an adjustment path;
    a mechanism for sensing each position of the seat relative to the floor pan in said adjustment path and providing a first unique output signal indicative of each and every linear position of the seat in said adjustment path;
    a sensor for sensing the weight of the vehicle occupant in the seat and providing a second output signal indicative of the weight of the vehicle occupant; and
    a controller for receiving said first unique output signal and said second output signal, said controller controlling actuation of said vehicle occupant protection device in accordance with said first and second output signals, said mechanism including a sensor lever for engaging a deflection member for deflection as said vehicle seat frame moves relative to the floor pan.

14. The apparatus as set forth in claim 13 wherein said actuatable vehicle occupant protection device is an air bag for mounting in the vehicle.

15. The apparatus as set forth in claim 13 wherein said sensor includes a plurality of sensors providing a plurality of signals for defining said second output signal.

16. The apparatus as set forth in claim 13 wherein said sensor lever may move in a first direction relative to said vehicle seat frame, said first direction being transverse to the direction of travel of the vehicle, said sensor lever further being capable of moving in a second direction relative to said vehicle seat frame, said second direction being transverse to the direction of travel of the vehicle, said first direction being opposite said second direction.

17. The apparatus as set forth in claim 13 wherein the amount of deflection of said sensor lever may increase as said vehicle seat frame moves relative to the floor pan; and the amount of deflection of said sensor lever may also decrease as said vehicle seat frame moves relative to the floor pan.

18. The apparatus as set forth in claim 13 wherein said controller utilizes said first output signal in order to disregard a part of said second output signal.

* * * * *